(12) United States Patent
Liao (10) Patent No.: US 6,334,743 B1
(45) Date of Patent: Jan. 1, 2002

(54) HIGH-SPEED ROTARY MACHINE

(76) Inventor: Yung-Chuan Liao, 13F, No 321, Sec. 4, Mei-Chuan West Rd., Taichung (TW), 406

( * ) Notice: Subject to any disclaimer, the term of this patent is extended or adjusted under 35 U.S.C. 154(b) by 0 days.

(21) Appl. No.: 09/501,282

(22) Filed: Feb. 9, 2000

(51) Int. Cl.[7] .............................................. B23B 45/06
(52) U.S. Cl. .......................... 408/16; 81/490; 408/124; 408/241 R
(58) Field of Search ...................... 408/16, 124, 241 R; 81/177.1, 177.4, 489, 490; 206/349, 372, 379

(56) References Cited

U.S. PATENT DOCUMENTS

| | | | | |
|---|---|---|---|---|
| 2,317,106 A | * | 4/1943 | Nummelin | 408/241 R |
| 4,240,771 A | * | 12/1980 | Derbyshire | 408/124 |
| 4,790,696 A | * | 12/1988 | Williams | 206/379 |
| 4,932,294 A | * | 6/1990 | Chang | 81/490 |
| 4,962,681 A | * | 10/1990 | Yang | 408/241 R |
| 4,973,205 A | * | 11/1990 | Spaulding | 408/16 |
| 5,445,479 A | * | 8/1995 | Hillinger | 408/16 |

* cited by examiner

Primary Examiner—Daniel W. Howell
(74) Attorney, Agent, or Firm—Dougherty & Troxell; Kuo-Hsiung Chiu (57) ABSTRACT

The present invention relates to a high-speed rotary machine having a main body, a driving device, a locking device, an illuminating device, two tool accommodation members and a number of tools. The driving device contains a through insertion hole which is aligned with two holes at the left and right body portions of the main body for the crank to insert into either side according to the user's habit or the convenience of the work. The main body includes at the top of the inner side of the holding part thereof a press button used for blocking the locking device in order to increase the torsion value of the applied force.

2 Claims, 8 Drawing Sheets

HIGH-SPEED ROTARY MACHINE

BACKGROUND OF THE INVENTION

1. Field of the Invention

The present invention relates to a high-speed rotary machine, and more particularly, to a convenient device with full functions and equipment to facilitate the application.

2. Description of the Prior Art

Figure 1:
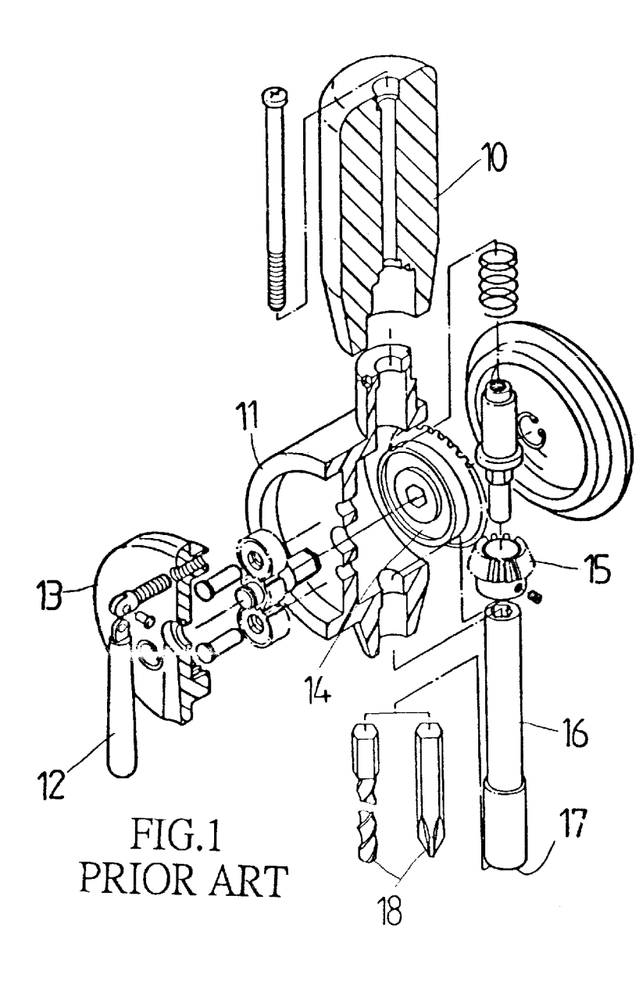
FIG. 1 is an exploded perspective view of a prior art high-speed rotary machine.
Figure 2:
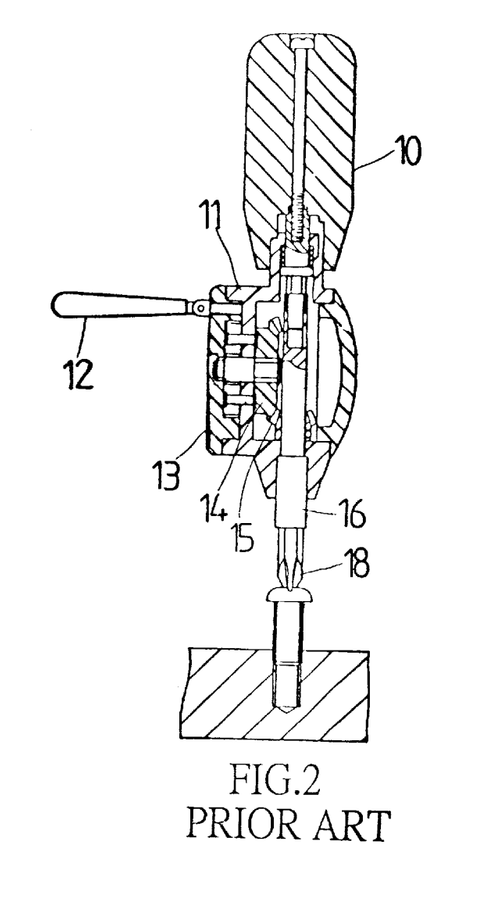
FIG. 2 is a sectional assembly view of the prior art high-speed rotary machine of FIG. 1.

First of all, referring to FIGS. 1 and 2, the prior art high-speed rotary machine includes a main body 10 on which a cylindrical body 11 is disposed. The cylindrical body 11 is fitted with a crank 12 at the outer side thereof so that a turning toothed disc 13 is driven by a driving device 14 for the toothed disc. Thereafter, a driven gear 15 is driven by the driving device 14 for the toothed disc to bring a locking device 16 in rotation. Furthermore, the tool 18 (screwdriver heads or bits) plugged in the insertion hole 17 at the front end of the locking device 16 is brought into a rapid rotation.

The prior art high-speed rotary machine can reach an expected high-speed rotary effect; however, it has the following inconveniences:

1. No blocking mechanism is provided on the locking device 16. Accordingly, when the application torsion value has to be increased (when the screw is tightened at the last step or when the screw is loosened at the first step), one hand has to hold on the main body 10 and the other hand holds the crank 12 in order to turn the whole main body 10 to an expected direction. But it presents a great inconvenience.
2. No preferable locating device for fixing the tools 18 is provided in the insertion hole 17 of the locking device 16 so that it's uneasy for the tools 18 to be separated from the insertion hole 17.
3. No tool accommodation is provided in the main body 10 for receiving and storing all kinds of tools 18.
4. The crank 12 is fitted to a single side of the main body 10. However, the user has to adjust the direction of the main body 10 and its crank 12 at any time due to the using habit of the user with the left and right hand or due to restriction of the working site.

SUMMARY OF THE INVENTION

It is therefore a primary object of the present invention to provide a high-speed rotary machine having a through insertion hole which is aligned with two holes at the left and right of the main body for the crank to insert into any side thereof according to the user's habit or the convenience of the work; moreover, an illuminating device and two tool accommodations are provided for adjusting to the operation and using requirements. Accordingly, the practicality and the convenience of the present invention are enhanced.

It is another object of the present invention to provide a high-speed rotary machine in which a locking device is provided in the most simple manner in order for the user to exactly and rapidly enhance the application torsion and to carry out the screw-tightening at the last step or the screw-loosening at the first step.

BRIEF DESCRIPTION OF THE DRAWINGS

The drawings disclose illustrative an embodiment of the present invention which serves to exemplify the various advantages and objects hereof, and are as follows.

DETAILED DESCRIPTION OF THE PREFERRED EMBODIMENT

Figure 3:
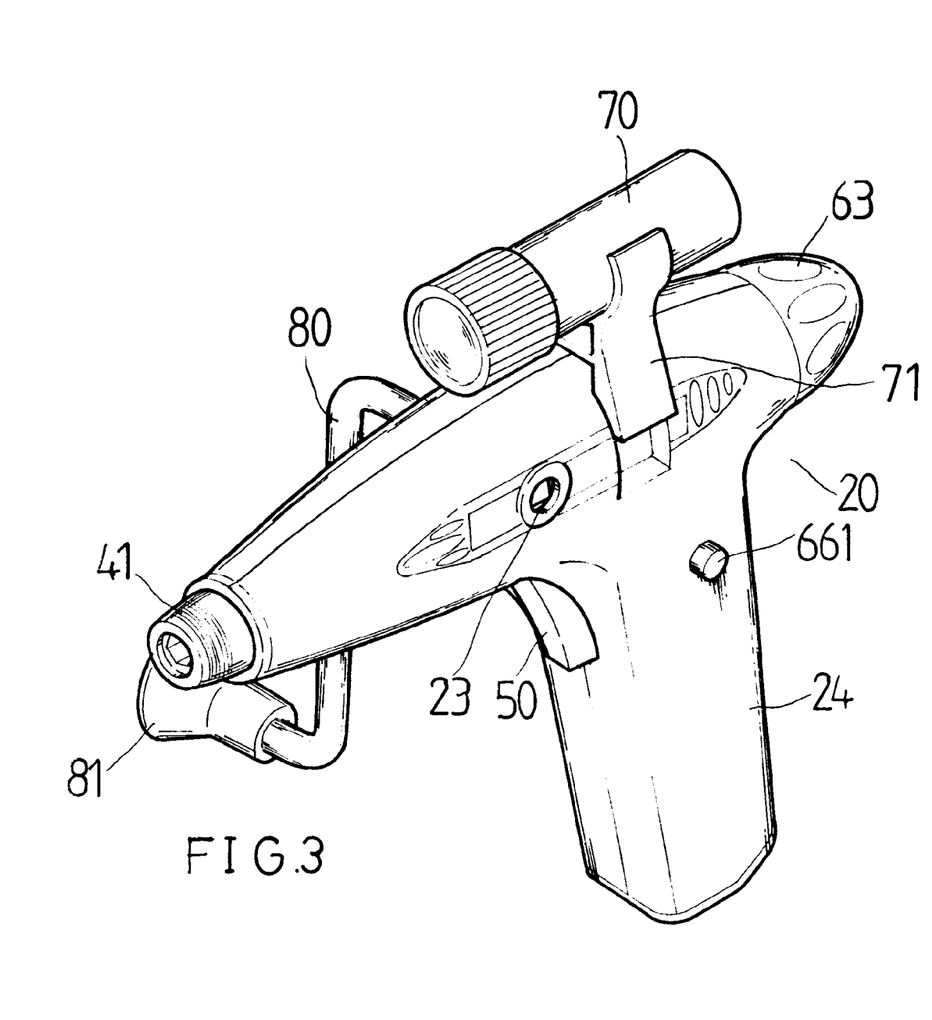
FIG. 3 is a perspective assembly view of the present invention.
Figure 4:
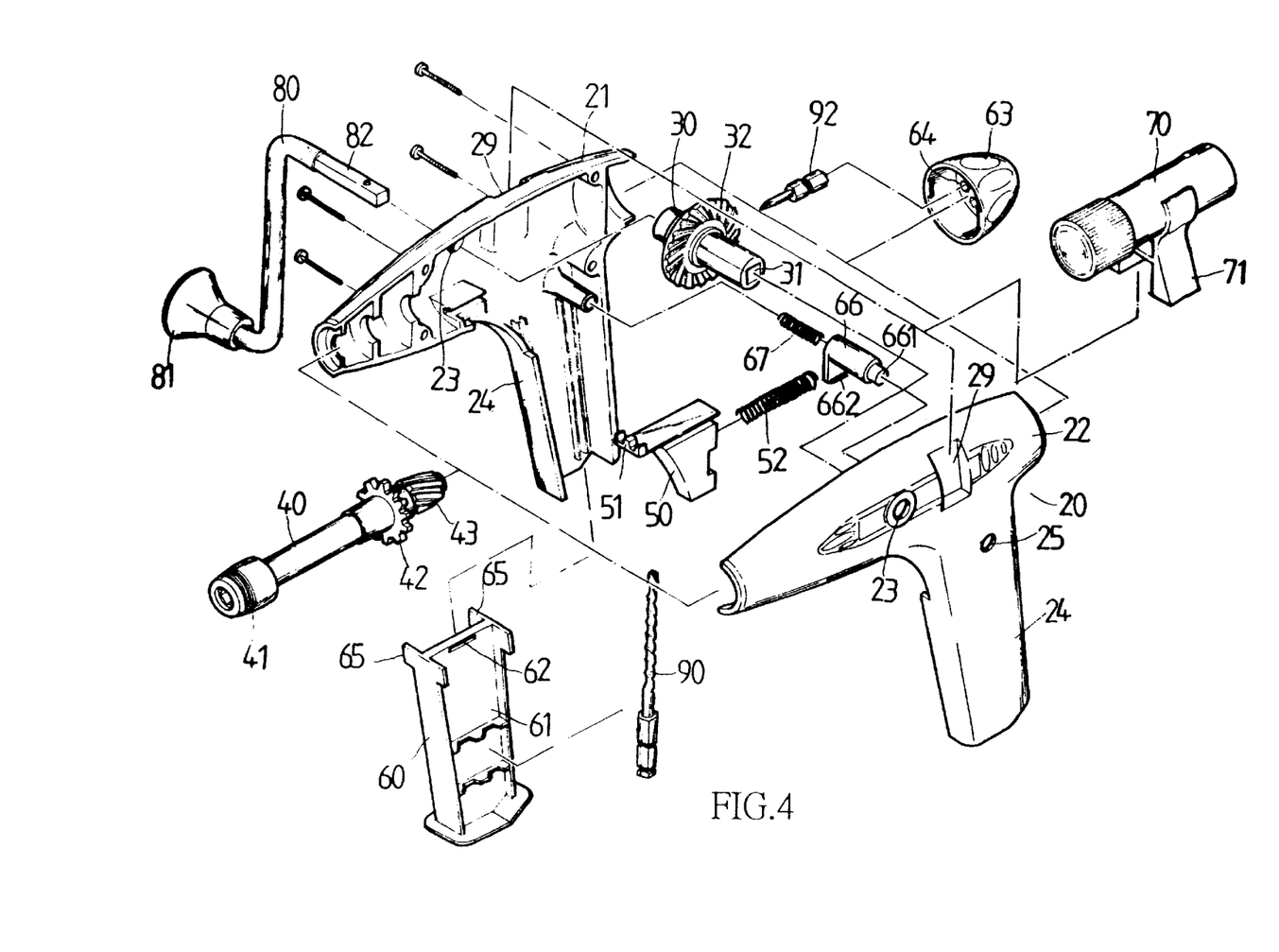
FIG. 4 is an exploded perspective view of the present invention.
Figure 5:
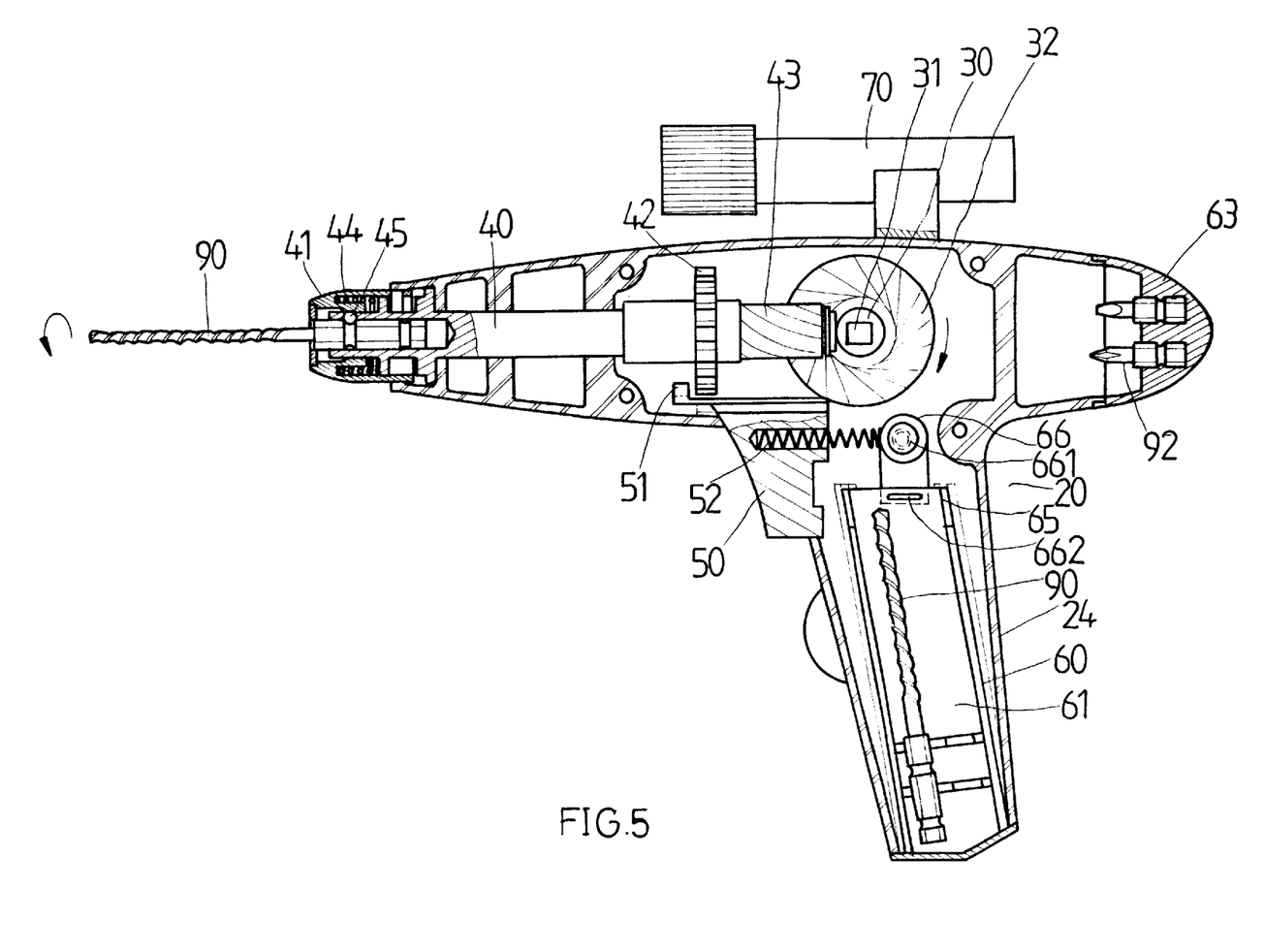
FIG. 5 is a sectional assembly view of the present invention.

First of all, referring to FIGS. 3, 4 and 5, the present invention includes a main body 20 created by the corresponding connection of a left body 21 and a right body 22. Within the left body 21 and the right body 22 is a driving device 30, a locking device 40, a press button 50, a first tool accommodation 60 and a release button 66. The main body 20 has at the center of the top end of the outer side thereof an insertion groove 29 for the insertion of an illuminating device 70. A through hole 23 is aligned with an insertion hole 31 of driving device 30 in order for a crank 80 to plug into. The right body 22 at the top of a holding part 24 has a hole 25 accommodating a protruding press end 661 of release button 66.

A driving device 30 has a bevel gear 32 and a through insertion hole 31 at the center thereof aligned with through hole 23.

Locking device 40 has a clamping member 41 at the front end thereof, a locking gear 42 at the center thereof and a driven gear 43 at the rear end thereof, said driven gear 43 and said bevel gear 32 being engaged with each other.

A press button 50 is disposed at the top of said holding part 24 of said main body 20 and has a locking tooth 51 in front of the top end thereof. The rear end of said press button 50 is elastically pushed by a spring 52.

A first tool accommodation member 60 is upwards inserted within said holding part 24 of said main body 20, said first tool accommodation member 60 having in the upper part thereof an accommodation space 61 for receiving a long tool 90 and having at the top thereof a hooked slot 62 releasably engaging a hook 662 with a release button 66.

The release button 66 is elastically pushed by spring 67, and has a hook 662 at the lower end thereof and a press end 661 at the rear end thereof.

A second tool accommodation member 63 is connected to the rear side of the top end of said main body 20, and has a plurality of receiving grooves 64 for accommodating short tools 92.

An illuminating device 70 has an H-shaped fastener 71 for connection with said insertion groove 29 at the top end of said main body 20.

A crank 80 having a grip 81 and an insert bar 82 insertable into said through hole 23 at either side of said main body 20 in order to enter into said through insertion hole 31 of said driving device 30 for performing the turning motion.

Figure 6:
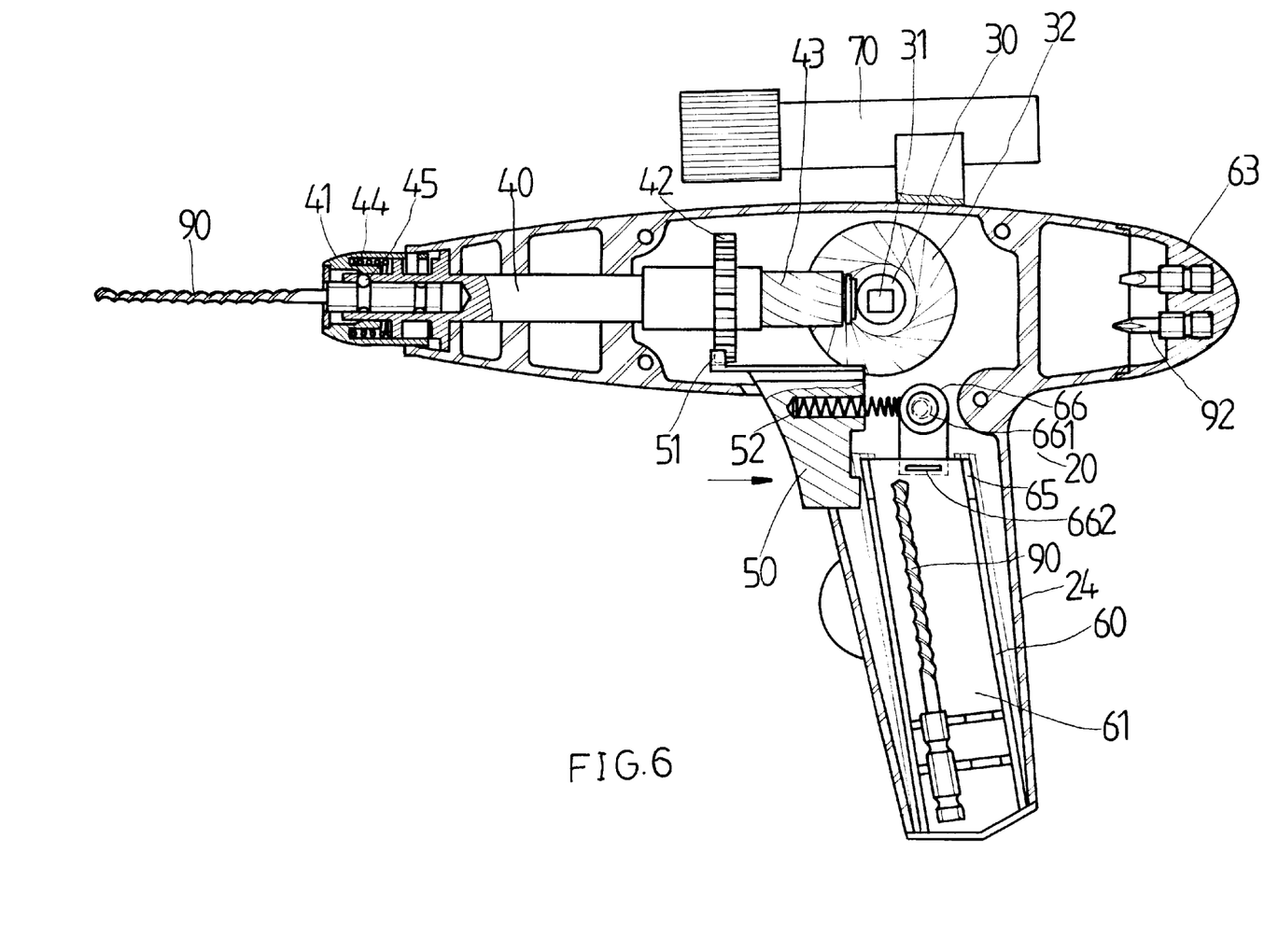
FIG. 6 is a sectional assembly view of the present invention, illustrating the action direction to block the locking device.

Again, referring to FIG. 6, in order to prevent the locking device 40 from being driven by the crank 80 and the driving device 30, the press button 50 is pressed backwards to enable the locking tooth 51 to be locked into the locking gear 42 of the locking device 40. Accordingly, the user can directly turn the main body 20 to obtain a higher torsion value. When the press button 50 is released, the press button 50 returns by means of the resilience of the spring 52 and the original rapid driving state is recovered.

Figure 7:
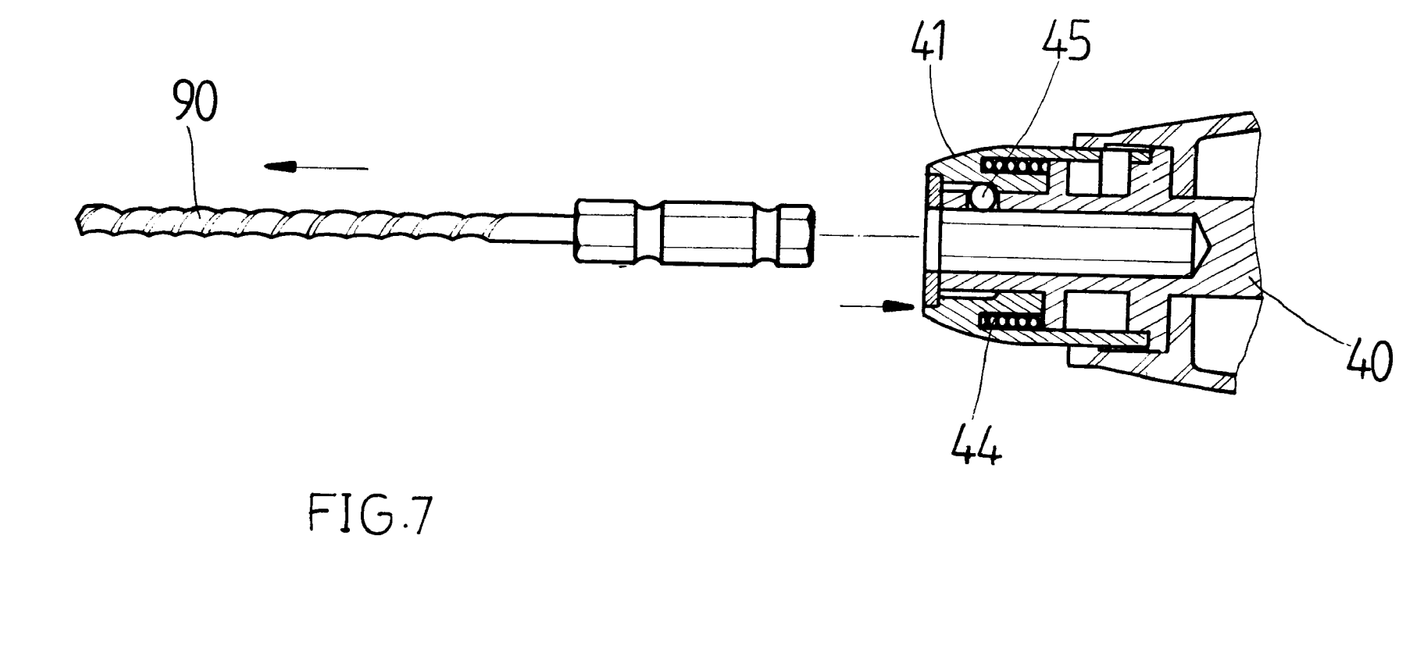
FIG. 7 is a schematic application drawing of a first tool accommodation of the present invention.

Referring to FIGS. 5 and 7, the clamping member 41 contains a spring 44 and a packing steel shot 45 to produce a better clamping strength for clamping tools therein and to avoid an unexpected separation of the tools from the clamping member 41.

The illuminating device 70 is a small flashlight so that its operation and inner components are the same as the conventional flashlight. It's not the feature of the present invention so that it won't be described in further detail.

Figure 8:
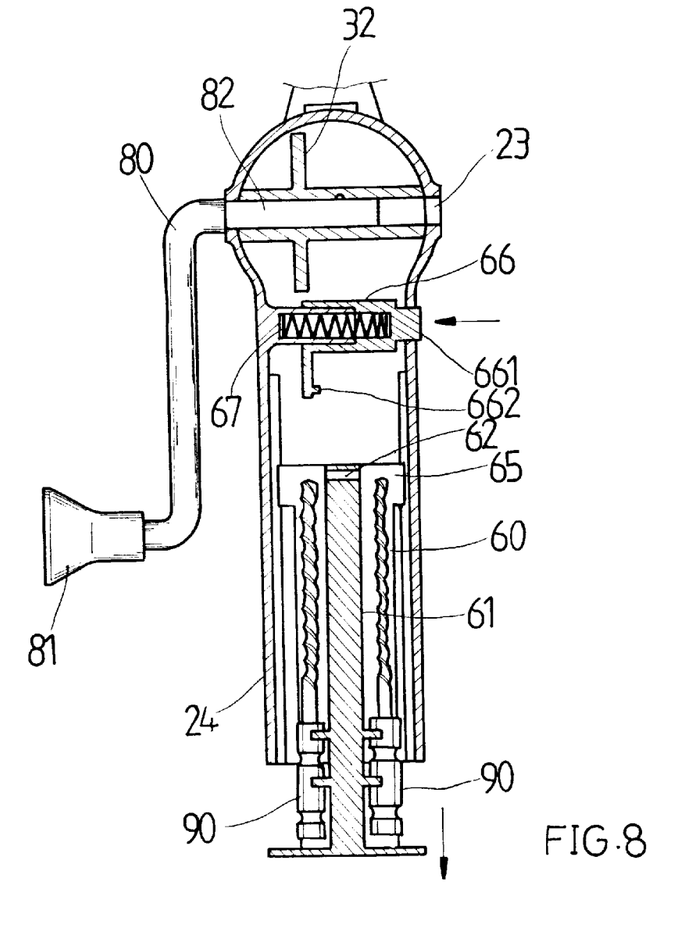
FIG. 8 is a schematic application drawing of the locking device for the tool.

Referring to FIG. 8, when the hooked slot 62 of the first tool accommodation member 60 is hooked by the hook 662 of the release button 66, the first tool accommodation 60 is hidden within the holding part 24 of the main body 20. In order to take out the longer tool 90, it's only required to press upon the press end 661 of the release button 66 to enable the hook 662 to be separated from the hooked slot 62 so that the first tool accommodation member 60 slides downwards out of the main body 20 due to its own weight. A blocking piece 65 is provided at the top thereof to prevent it from separation from the main body 20.

Figure 9:
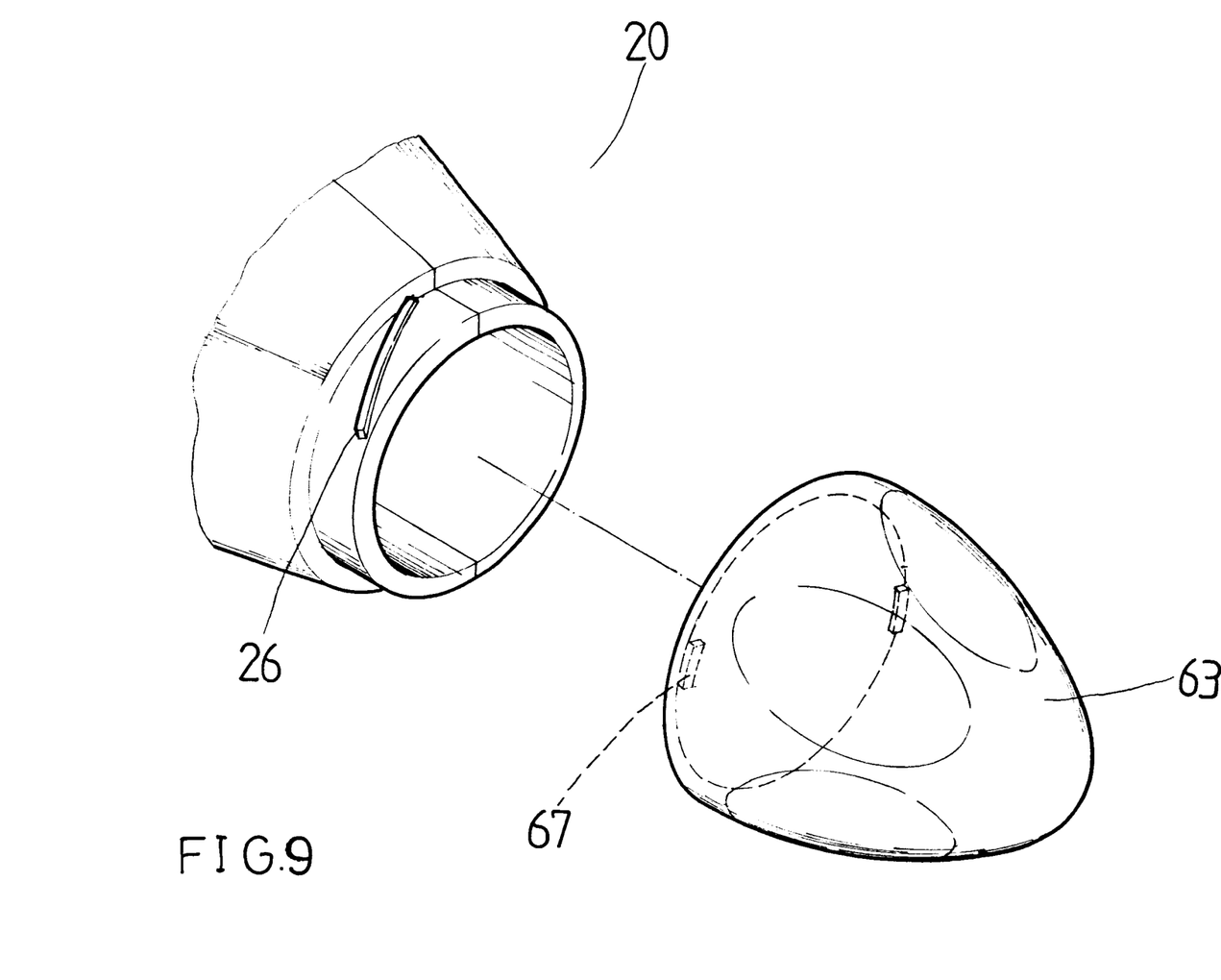
FIG. 9 is a schematic application drawing of a second tool accommodation of the present invention.

Finally, as shown in FIG. 9, the second tool accommodation member 63 is fastened to the main body 20 by engagement of locking projections 67 on the inner side of the second tool accommodation member 63 with guide projections 26 on the main body 20.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A high speed rotary machine comprising:
    a) a main body having a left body portion, a right body portion and a holding part, the left and right body portions each having a through hole and one of the left and right body portions having a press end accommodating hole;
    b) a driving device rotatably located within the main body and including a bevel gear and a through insertion hole aligned with the through holes in the left and right body portions;
    c) a locking device rotatably mounted in the main body and including a tool clamping member, a locking gear and a driven gear engaged with the bevel gear;
    d) a press button movably mounted in the holding part of the main body and including a locking tooth, the press button being movable between a first position in which the locking tooth is displaced from the locking gear of the locking device, and a second position in which the locking tooth is engaged with the locking gear so as to prevent rotation of the locking device relative to the main body;
    e) a first spring acting on the press button biasing the press button toward the first position;
    f) a first tool accommodation member movably mounted in the holding part of the main body, the first tool accommodation member having an upper portion with a hook slot;
    g) a release button movably located in the main body and including a lower hook portion and a press end extending through the press end accommodating hole, the release button being movable between a first position in which the lower hook portion engages the hook slot of the first tool accommodation member, and a second position in which the lower hook portion is disengaged from said hook slot;
    h) a second spring acting on the release button so as to bias the release button toward the first position;
    i) a second tool accommodation member releasably attached to a rear portion of the main body, the second tool accommodation member having a plurality of inner tool receiving grooves;
    j) an illuminating device attached to a top side of the main body; and,
    k) a crank handle having a grip and being removably insertable into either of the through holes in the left and right body portions so as to engage the through insertion hole of the driving device and provide rotation of the bevel gear.

2. The high speed rotary member of claim 1 wherein the tool clamping member a packing steel shot to clamp a tool inserted therein.

\* \* \* \* \*